United States Patent
Peon

(10) Patent No.: US 10,735,737 B1
(45) Date of Patent: Aug. 4, 2020

(54) BIT ASSIGNMENT BASED ON SPATIO-TEMPORAL ANALYSIS

(71) Applicant: Google Inc., Mountain View, CA (US)

(72) Inventor: Roberto Peon, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 236 days.

(21) Appl. No.: 15/454,602

(22) Filed: Mar. 9, 2017

(51) Int. Cl.
*H04N 19/137* (2014.01)
*H04N 19/172* (2014.01)
*H04N 19/146* (2014.01)
*H04N 19/159* (2014.01)

(52) U.S. Cl.
CPC ......... *H04N 19/137* (2014.11); *H04N 19/146* (2014.11); *H04N 19/159* (2014.11); *H04N 19/172* (2014.11)

(58) Field of Classification Search
None
See application file for complete search history.

(56) References Cited

U.S. PATENT DOCUMENTS

| | | | |
|---|---|---|---|
| 6,628,715 B1 * | 9/2003 | Iu | H04N 19/537 375/240.16 |
| 8,064,638 B2 | 11/2011 | Kato et al. | |
| 8,542,731 B2 | 9/2013 | Tourapis et al. | |
| 2007/0230565 A1 | 10/2007 | Tourapis et al. | |
| 2010/0278231 A1 * | 11/2010 | Gutman | H04N 19/172 375/240.02 |
| 2014/0269903 A1 * | 9/2014 | McCarthy | H04N 19/176 375/240.03 |
| 2016/0219248 A1 | 7/2016 | Neff et al. | |

OTHER PUBLICATIONS http://www.merriam-webster.com/dictionary/perceptible[May 1, 2019 5:36:49 PM] (Year: 2019).*
http://www.merriam-webster.com/dictionary/perceive[May 1, 2019 5:37:24 PM] (Year: 2019).*

* cited by examiner

*Primary Examiner* — Lindsay J Uhl
(74) *Attorney, Agent, or Firm* — Brake Hughes Bellermann LLP

(57) ABSTRACT

A method includes: performing spatio-temporal analysis on each frame of a video frame sequence; determining, based on the spatio-temporal analysis, how well a first region of a first frame of the video frame sequence meets a human-perception criterion; assigning, based on the identification, a bit weight for an encoder to apply in encoding the first region; and encoding, using the encoder, at least the first frame based on the spatio-temporal analysis, wherein the first region is encoded using the assigned bit weight.

28 Claims, 4 Drawing Sheets

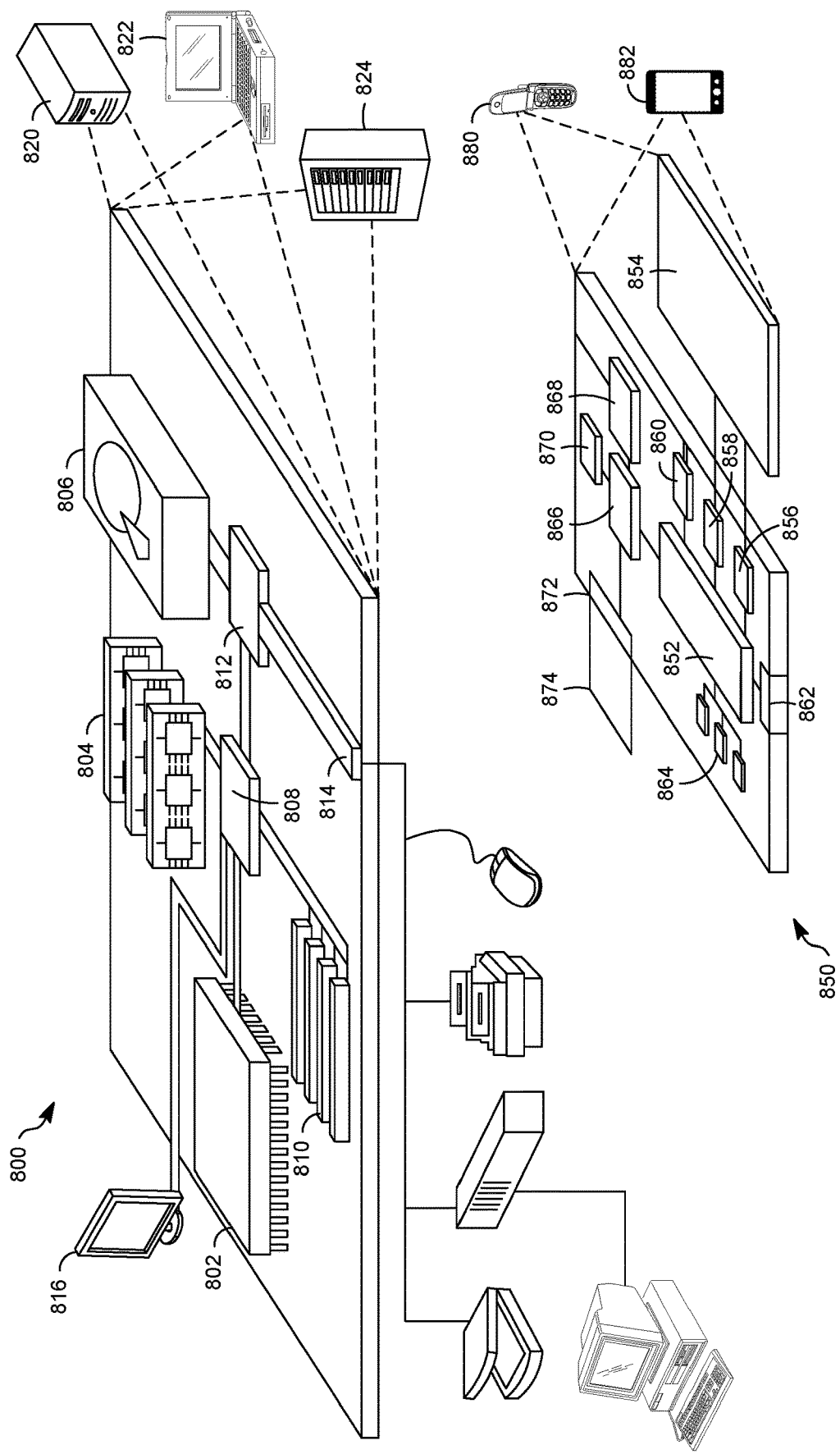

BIT ASSIGNMENT BASED ON SPATIO-TEMPORAL ANALYSIS

TECHNICAL FIELD

This document relates, generally, to bit assignment based on spatio-temporal analysis.

BACKGROUND

Video encoders and video coders/decoders (sometimes referred to as codecs) are used in a variety of contexts where video content is processed. Current video codecs can attempt to encode frame-to-frame change in a video, and then compress that change in a lossy manner. In so doing, the codec will use bits to represent the video content. In particular, the codec may use bits trying to encode some feature in the video content that moves so quickly that a human cannot perceive the detail of that feature. For example, the feature may be visible only in a single frame. That is, unless the person pauses the video playback at that particular frame, he or she will not perceive the feature. The compression reduces the number of bits used for the feature, but the total number of bits available for coding the video content can be capped by an external limit, such as a requirement to meet a target bitrate. As a result, the encoder has nevertheless spent fewer bits encoding the video features that do matter to human perception. Current video codecs can also attempt to do motion search, which is a spatio-temporal analysis. However, it is believed that they use this to compress the feature: that is, by indicating that something has moved in the bitstream so the changes (i.e., deltas) which must be encoded can be smaller.

SUMMARY

In a first aspect, a method includes: performing spatio-temporal analysis on each frame of a video frame sequence; determining, based on the spatio-temporal analysis, how well a first region of a first frame of the video frame sequence meets a human-perception criterion; assigning, based on the determination, a bit weight for an encoder to apply in encoding the first region; and encoding, using the encoder, at least the first frame based on the spatio-temporal analysis, wherein the first region is encoded using the assigned bit weight.

Implementations can include any or all of the following features. The spatio-temporal analysis can comprise an optical flow analysis of each frame of the video frame sequence. The determination regarding the first region can comprise determining that the first region has no flow, or a flow larger than a flow criterion. The optical flow analysis can comprise defining a vector for at least one pixel in the first region based on at least a second frame of the video frame sequence, the vector representing a spatio-temporal change for the at least one pixel, wherein the human-perception criterion comprises a vector correlation criterion, and wherein the determination regarding the first region comprises determining whether the vector meets the vector correlation criterion. The determination may indicate that first region does not meet the human-perception criterion and a second region within the video frame sequence does meet the human-perception criterion, and assigning the bit weight can comprise assigning a lesser bit weight for the first region than another bit weight assigned for the second region, resulting in fewer bits being used for encoding the first region than for encoding the second region. The other bit weight can be assigned to the second region in response to determining that the first region does not meet the human-perception criterion. The second region can be in the first frame. The determination may indicate that first region does meet the human-perception criterion well, and assigning the bit weight can comprise assigning at least a predefined standard bit weight. The determination may indicate that first region significantly exceeds the human-perception criterion, and assigning the bit weight can comprise exceeding the predefined standard bit weight. The spatio-temporal analysis can comprise a motion estimation performed in the encoder. Assigning the bit weight can comprise preprocessing the first region before the encoder encodes the first region, the preprocessing modifying the first region to create a modified first region in the first frame, wherein the encoder encodes the modified first region using the assigned bit weight. Modifying the first region can comprise blurring the first region. The method can further include iteratively changing an amount of preprocessing done in response to a bitrate output of the encoder until a target bitrate or a target quality score is achieved. The spatio-temporal analysis and the determination regarding the first region can comprise comparing first pixel contents of the first frame with second pixel contents of a second frame of the video frame sequence and determining how the first pixel contents develop spatially and temporally between the first and second frames. The determination can include determining how much the first feature corresponds to a predefined measure. The determination can include determining whether the first region meets the human-perception criterion, and the determination can generate a Boolean value. The determination can comprise a probabilistic determination. The probabilistic determination can generate a result on a sliding scale of probability, and assigning the bit weight can comprise scaling the bit weight based on the result. The probabilistic determination can generate a weight which indicates how likely the first feature meets the human-perception criterion.

In a second aspect, a computer program product is tangibly embodied in a non-transitory storage medium, the computer program product including instructions that when executed cause a processor to perform operations including: performing spatio-temporal analysis on each frame of a video frame sequence; determining, based on the spatio-temporal analysis, how well a first region of a first frame of the video frame sequence meets a human-perception criterion; assigning, based on the determination, a bit weight for an encoder to apply in encoding the first region; and encoding, using the encoder, at least the first frame based on the spatio-temporal analysis, wherein the first region is encoded using the assigned bit weight.

In a third aspect, a system includes: a video frame sequence; a spatio-temporal analyzer for the video frame sequence, the spatio-temporal analyzer determining how well a first region of a first frame of the video frame sequence meets a human-perception criterion; and an encoder that encodes, based on the spatio-temporal analyzer, at least the first frame using a bit weight assigned based on the determination.

Implementations can include any or all of the following features. The spatio-temporal analyzer can be included in the encoder. The spatio-temporal analyzer may not be included in the encoder, and the system can further comprise a preprocessor configured to preprocess the first region before the encoder encodes the first region, the preprocessor modifying the first region to create a modified first region in the first frame, wherein the encoder encodes the modified first region using the assigned bit weight. The preprocessor can blur the first region.

BRIEF DESCRIPTION OF DRAWINGS

FIG. 8 shows an example of a computer device and a mobile computer device that can be used to implement the techniques described here.

Like reference symbols in the various drawings indicate like elements.

DETAILED DESCRIPTION

This document describes examples of bit assignment for video that is based on spatio-temporal analysis (STA). STA can be used to decide which features should keep fidelity, and which may lose fidelity, in the encoding process. For example, based on the STA it can be determined which pixels and/or features are likely to be perceived by a human as time advances, and an encoder can then be induced to use more bits on those parts, and less bits on the parts not likely to be perceived by a human. In some implementations, the unlikeliness of perception can be due to the region/pixels moving relatively quickly and/or because the details thereof do not correlate with details in that area a moment later. Static on a TV is an example that satisfies the criterion of having lack of correlation in details. Solely as an example, such an approach to coding can be advantageous when encoding video shot with quick shutters. As another example, it can be useful when encoding video games, which sometimes have high-detail, high-motion, non-motion blurred products. An approach that pays attention not just to details in one frame but to whether or not a person can perceive that detail, can facilitate that videos are encoded in fewer bits for the same perceptual quality, or in higher perceptual quality for the same bitrate. The format of the output of the encoder—that is, the protocol that is the compressed video format, can be unchanged. That is, the changes that facilitate bit assignment based on spatio-temporal analysis may not show up in the transmission channel or at the decoder. Rather, they can be entirely contained within an encoder or a preprocessor.

Figure 1:
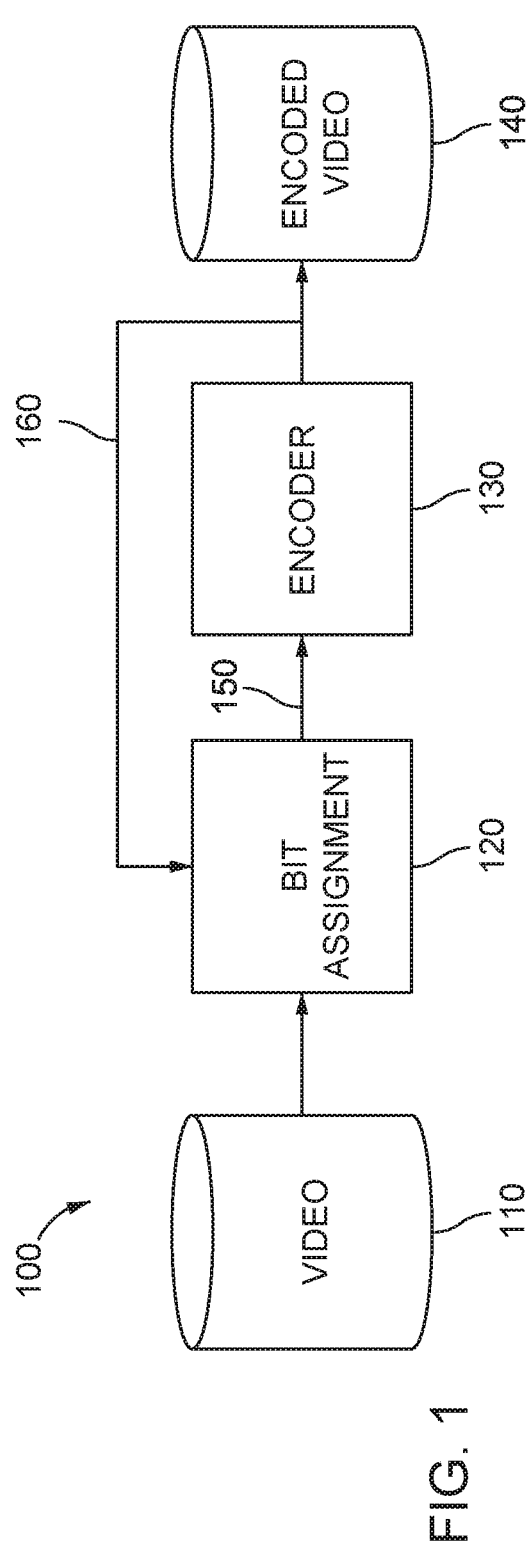
FIG. 1 shows an example of a system that can perform spatio-temporal matching based bit assignment for video.

FIG. 1 shows an example of a system 100 that can perform spatio-temporal matching based bit assignment for video. The system 100 includes a source and/or storage of at least one video 110. The video 110 is here currently not encoded; the system 100 can be used for encoding the video 110. For example, the system 100 can be part of a camera system, by which camera the video 110 is generated. As another example, the system 100 can be separate from a camera system and perform coding of video content generated by that camera system or others.

The system 100 includes a bit assignment module 120 that can be embodied in software, hardware, or combinations thereof. The bit assignment module 120 receives the video 110 as an input and can perform STA thereon. The system 100 includes an encoder 130 that receives one or more inputs generated by the bit assignment module 120. The encoder 130 can be configured to apply different numbers of bits to selected areas based on received input (e.g., based on a specified bit measure), and the bit assignment module 120 can provide such input to the encoder 130. In such examples, the video 110 can be provided to the encoder 130 by the bit assignment module 120 or otherwise. As another example, the bit assignment module 120 can perform preprocessing on a selected portion of the video such that the encoder then uses fewer bits to encode that portion than what would otherwise have been the case. The encoder 130 can be a dedicated encoder or part of a codec. The encoder 130 generates encoded video 140. For example, the encoded video 140 can be played on a display device for observation by a viewer, stored in the system 100 using a suitable storage medium, and/or can be transmitted to another system for storage or playback.

The STA performed by the bit assignment module 120 seeks to determine whether the video contains any aspect that is unlikely to be perceived by a human when the video is played. The STA can be used for determining how well a given feature meets a predefined criterion relating to human perception. This can involve a numeric or otherwise quantified determination that indicates by how much the feature corresponds to (e.g., is more than, or is less than) a predefined measure or range. In some implementations, the determination can involve a probabilistic determination, such as to establish the likelihood that a human will perceive a certain amount of (e.g., percentage of) the details in the feature. For example, the STA can determine a weight which indicates how likely a given feature meets the predefined criterion. In some implementations, a result of the STA can be a sliding scale of probability, and a responsive action can be scaled according to the result. For example, when the result indicates a particular probability of viewer perception, that probability can be converted into a corresponding value for a bit measure, so that a higher probability of viewer perception triggers use of a relatively higher bit measure, and vice versa. In some implementations, the STA can determine (in a numerical or otherwise discrete fashion) whether the aspect meets a predefined criterion, and the result of the STA can then be a Boolean value indicating whether the criterion is met. That is, the STA can compute a weight that is used (either in a Boolean way or not) to influence the number of bits used to encode the analyzed region of the video. This influence can involve preprocessing the content before sending it to an encoder, or specifying bit weights to the encoder, or specifying to the encoder the number of bits to be assigned.

The STA is temporal in that it can take into account two or more of the video frames that make up the video 110, and is spatial in that it can take into account where in each individual frame the content is located. For example, the STA can include comparing first pixel contents of a frame with at least second pixel contents of at least one other frame of the video frame sequence, and determining how the first pixel contents develop spatially and temporally between the frames.

The bit assignment module 120 can instruct the encoder 130 so as to affect the number of bits that the encoder 130 uses for any or all regions of a video frame. A respective bit weight can be assigned for the encoding of any feature in the video frame. In some implementations, a standard bit weight can be predefined. For example, assigning a greater bit weight than the standard bit weight results in a larger number of bits being used for the encoding of that feature than if the standard bit weight had been assigned. Assigning a smaller bit weight than the standard bit weight results in a smaller number of bits being used for the encoding of that feature than if the standard bit weight had been assigned. In some implementations, the bit assignment module 120 identifies a region of a frame as being unlikely to be perceived by a human, and can instruct the encoder 130 to use the smaller number of bits in encoding that region. Such instruction can be by way of an input 150 from the bit assignment module 120 to the encoder 130. For example, the bit assignment module 120 can provide the encoder 130 with a bit measure specifically for encoding the identified region. The bit assignment module 120 can select the bit measure based on having identified the region. The bit measure can characterize the bit assignment in one or more ways, such as by specifying how many bits the encoder 130 should use when encoding the region.

The bit assignment module 120 can perform preprocessing on one or more regions of the video 110 so as to affect the number of bits that the encoder 130 uses for any or all regions of a video frame. For example, the bit assignment module 120 can perform blurring or other processing on at least one region of the video 110, thereby causing the encoder 130 to use relatively fewer bits to encode that region. The input 150 from the bit assignment module 120 to the encoder 130 can include a modified version of the video 110 based on such preprocessing.

In some implementations, the bit assignment module 120 can take into account a bitrate of an output of the encoder 130, as schematically illustrated by a feedback 160 from the encoder 130 to the bit assignment module 120. In some implementations, such feedback 160 can be done iteratively. For example, the bit assignment module 120 can iteratively change an amount of preprocessing done in response to the bitrate output of the encoder 130 until a target bitrate or a target quality score is achieved. In some implementations, the system can vary the bitrate, or vary the quality. The target quality can be defined by any of various measures, including, but not limited to, peak signal-to-noise ratio (PSNR) and/or human quality raters.

As mentioned, the encoder 130 can use relatively fewer bits to encode one or more particular regions in the video 110 based on the STA performed by the bit assignment module 120. For example, this can allow the encoder 130 to use an overall lower number of bits to encode the video 110 than what would otherwise be the case. As another example, it can allow the encoder 130 to spend extra bits on encoding one or more other aspects of the video 110. In some implementations, another region within the video 110 can then be provided with a larger number of bits for encoding. This can be the same number of bits that were saved in encoding the identified region, or a larger or smaller number. The other region can be in the same frame as the identified region or in a different frame of the video 110. For example, the other region can be identified as one including content that is likely to be perceived by a human while watching the encoded video 140.

In some implementations, a method relating to bit assignment based on STA can be performed. The method can include the bit assignment module 120 performing STA on each frame of a sequence of frames in the video 110. The method can include the bit assignment module 120 identifying, based on the STA, a first region of a first frame of the video frame sequence as not meeting a human-perception criterion. The method can include assigning, based on the identification, a smaller number of bits for the encoder 130 to encode the first region than for another region within the video frame sequence. The method can include encoding, using the encoder 130, at least the first frame based on the STA, wherein the first region is encoded using the smaller number of bits according to the assignment.

In the above example, the STA was performed on at least two frames of a video sequence. In some implementations, STA can be performed on one or more layers of a video sequence. For example, at least one layer of a Scalable Video Codec (SVC) presentation of a video can be analyzed. The various portions of the video can then be encoded in higher or lower bitrate based on the STA, and recombined for viewing.

Figure 2:
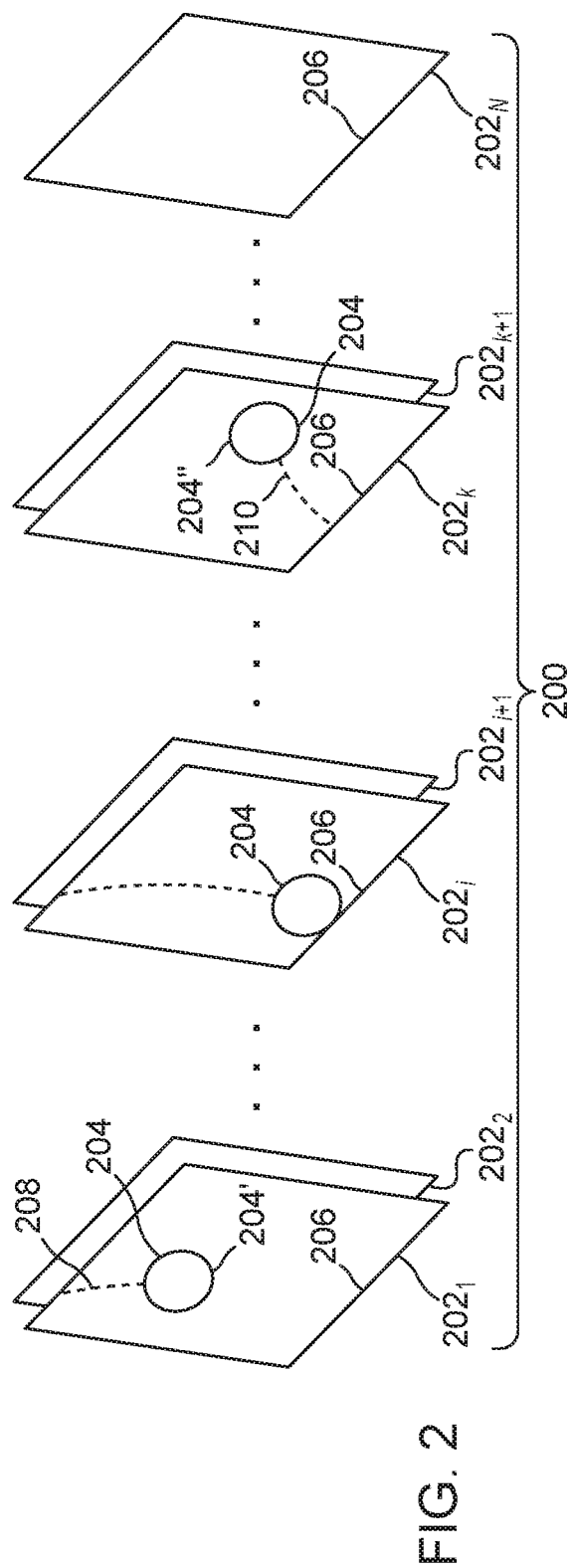
FIG. 2 schematically shows an example of a video frame sequence.

FIG. 2 schematically shows an example of a video frame sequence 200. The video frame sequence 200 is here currently not encoded, and may have been generated by a camera in any kind of system for capturing video content, including, but not limited to, a smartphone. The following examples illustrate how certain content can be identified as being less likely to be perceived by a human during playback, which identification can then be used to control the encoding of at least that content in the video frame sequence 200.

The video frame sequence 200 here includes an arbitrary number N of video frames, labeled $202_1$ through $202_N$, respectively. Some of the N frames 202 are shown here for illustrative purposes, and others are not shown for clarity. In particular, frames $202_1$, $202_2$, $202_i$, $202_{i+1}$, $202_k$, $202_{k+1}$ and $202_N$ are explicitly shown, it being understood that arbitrary numbers of frames (e.g., one or more) of the video frame sequence 200 have here been omitted. The example involves video content showing a ball 204 that is in motion, but implementations can include a video frame sequence of any other type of content. STA can be performed on the video frame sequence 200 to identify one or more regions in at least one of the frames 202.

In video frame $202_1$ the ball 204 is in motion relative to (e.g., falling towards) a surface 206, as schematically illustrated by a dashed line 208. The dashed line 208 need not appear in the video during playback but is here used to represent the movement of the ball 204 and the direction thereof.

A human-perception criterion (HPC) can be applied as part of the STA. In some implementations, the HPC corresponds to what a person is likely to perceive when watching video playback of the video frame sequence 200. For example, the HPC can take into account whether video content moves sufficiently fast between nearby ones of the frames 202 (e.g., from one of the frames 202 to the next) that a person is unlikely to perceive details of that content, or at least is unlikely to perceive much of the details of that content. As another example, the HPC can take into account whether details of an area within one of the frames 202 sufficiently correlates with details in that area a moment later, such as in the next frame, or in the nth frame from the current frame, where n is an arbitrary number. The following examples will use n=1 for simplicity, such that the STA mainly depends on the changes discovered relative to the next frame in the video frame sequence 200. However, a different number than n=1 can be used.

That is, a position of the ball 204 within the video frame $202_1$ can be determined as part of the STA. Moreover, the position of the ball 204 within the video frame $202_2$ can also be determined as part of the STA. The difference in position indicates whether the ball 204 is currently in motion, and the direction and speed thereof. Here, the STA reveals that the motion of the ball 204 in the frame $202_1$ exceeds the HPC. The ball 204 is therefore unlikely to be perceived by a human with any or much detail during video playback. Fewer bits can therefore be assigned to the encoding of the ball 204 in at least the frame $202_1$ based on the STA. As a particular example, the ball 204 in the video frame $202_1$ can be preprocessed (e.g., blurred) to generate a modified ball 204' in the video frame $202_1$. The preprocessing affects the content of the video frame $202_1$ but is not perceptible in the present illustration. For example, one or more high-frequency components of the content corresponding to the ball 204 can be removed or converted to low-frequency details so as to generate the modified ball 204'. A corresponding STA can be performed for the frame $202_2$ relative to one or more subsequent frames. As a result of that STA, one or more features of the frame $202_2$ can be modified as applicable.

In the video frame $202_i$ the ball 204 has reached the surface 206. The ball 204 may or may not be perceivably deformed as a result of the impact. STA performed on at least the video frame $202_i$ and the video frame $202_{i+1}$ indicates that, in the instant shown in the video frame $202_i$, the ball 204 is essentially stationary relative to the surface 206. The STA can therefore reveal that the motion of the ball 204 in the frame $202_i$ meets the HPC. The ball 204 is thus likely to be perceived by a human with at least a certain amount of detail during playback. No reason may therefore exist to assign fewer bits to the ball 204 in the video frame $202_i$. Rather, at least a normal or ordinary amount of bits can be assigned to the encoding of the ball 204 in at least the frame $202_i$ based on the STA. In some implementations, an extra amount of bits can be applied to certain content (such as that of the ball 204 in the video frame $202_i$) based on having identified non-HPC compliant content in that or another video frame. In some implementations it can be determined whether a feature (e.g., the ball 204 in the video frame $202_i$) significantly exceeds the HPC, and if so a higher bit weight can be assigned to that feature. For example, the HPC can be evaluated based on a numerical feature (e.g., a vector correlation criterion) and when the correlation of the evaluated feature is significantly greater than the HPC, more bits can be assigned. A corresponding STA can be performed for the frame $202_{i+1}$ relative to one or more subsequent frames.

In video frame $202_k$, moreover, the ball 204 is leaving (e.g., traveling upward from) the surface 206, as schematically indicated by a dashed line 210. That is, a position of the ball 204 within the video frame $202_k$ and within at least the video frame $202_{k+1}$ can be determined as part of the STA. The difference in position indicates whether the ball 204 is in motion, and the direction and speed thereof. Here, the STA reveals that the motion of the ball 204 in the frame $202_k$ exceeds the HPC. The ball 204 is therefore unlikely to be perceived by a human with any or much detail during playback. Fewer bits can therefore be assigned to the encoding of the ball 204 in at least the frame $202_k$ based on the STA. As another example, the ball 204 in the video frame $202_k$ can be preprocessed (e.g., blurred) to generate a modified ball 204" in the video frame $202_k$. A corresponding STA can be performed for the frame $202_{k+1}$ relative to one or more subsequent frames.

In the video frame $202_N$, finally, the ball 204 is no longer visible but the surface 206 may still be visible. STA can be performed on the video frame $202_N$. Here, the STA reveals that no content in the video frame $202_N$ fails to meet the HPC. The video frame $202_N$ may therefore be coded using at least the normal or ordinary number of bits.

The above examples illustrate removal or blurring of content that does not meet an HPC based on STA. This is distinct from an existing type of preprocessing that can be performed based on differences in resolution. For example, if video content is generated at a 4K resolution and is intended to be viewed by a person using a 720p screen, then preprocessing can be performed which removes detail that could never be perceived because it would not be presentable. This is often done when transcoding video to lower resolutions. However, these approaches are not based on STA, and does not merely address individually identified content.

Another existing and distinct technology relates to noise removal. Noise removal is generally not automated. Rather, noise removal can involve characterization of noise and thereafter removal of that noise, possibly for reinsertion later. The present examples, on the other hand, can selectively remove content whether or not the content actually is noise, and also if there is detail in the content, as long as it is deemed not useful to a human observer.

Figure 3:
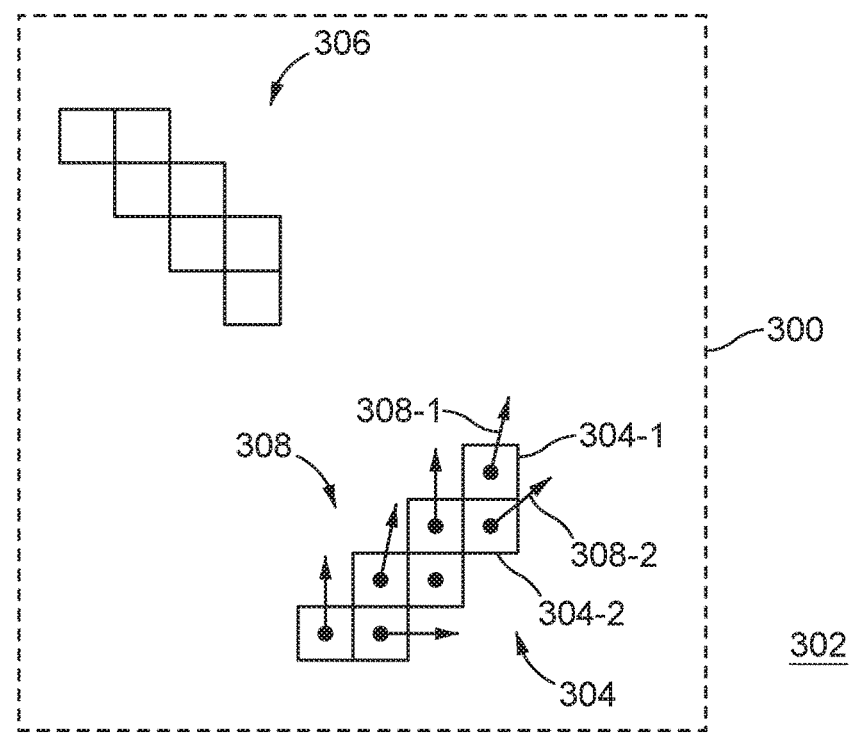
FIG. 3 shows an example of spatio-temporal analysis.

FIG. 3 shows an example of STA. The analysis is described with reference particularly to an area 300 within a video frame 302 that is part of a video frame sequence (not shown). The STA can be performed for some or all areas within the video frame 302. The STA can also be performed for one or more areas in other frames of the video frame sequence of which the video frame 302 is a part.

The area 300 can include a number of pixels, such as a rectangular pattern with rows and columns of pixels. Only some pixels of the area 300 are shown here for clarity, namely those of a feature 304 and a feature 306. Each pixel is here schematically represented as a square. The STA can then involve comparing a development of the feature 304 and/or 306 with pixels in a next or later frame (not shown) in the video frame sequence. The STA can seek to define a direction and distance that a pixel is moved (e.g., translated) from one frame to another. Particularly, performing the STA can include the definition of vectors 308 for some or all of the pixels in the feature 304 or 306. Such vectors can indicate the direction and amount of translation in the upcoming frame(s). Here, for example, a pixel 304-1 has associated with it a vector 308-1. Similarly, a pixel 304-2 that is also in the feature 304 can have associated with it a vector 308-2, and so on.

That is, the vectors 308 can form a vector field associated with the individual pixels of the feature 304. Here, a relatively long vector in the vector field indicates that the pixel at issue is moved a relatively large distance until the subsequent frame used for comparison. As another example, if the vectors 308 of the pixels within the feature 304 have significantly different directions from each other, then there is less correlation between the appearance of the feature 304 in the area 300 and the appearance it will have in the subsequent frame used for comparison. Of course, if the frames that are subject to the STA (e.g., two consecutive frames) are such that there is very little resemblance between the feature in the first frame and any part of the second frame, then it may not be possible to define any vector for one or more pixels based on the STA. For at least one of the pixels in the feature 304 it was here not possible to define a vector due to the significant change to be undergone by that pixel until the subsequent frame. Rather, such pixel(s) can then be deemed as not meeting the HPC, thereby making the pixel(s) a candidate for having relatively fewer bits assigned for encoding. Accordingly, that pixel is in this example marked with a dot, schematically representing the absence of a vector for that pixel.

When vectors are defined as part of the STA, the HPC can involve a vector correlation criterion (VCC). The VCC is selected so that when the translation of a pixel between the respective frames is such that the viewer is likely to perceive that motion, then the vector of that pixel satisfies the VCC. For example, the lengths and/or directions of the vectors 308 for the feature 304 can be taken into account in the VCC.

Defining the vectors 308 for the feature 304 in the area 300 can be part of performing an optical flow analysis as part of the STA. For example, if the vectors in a particular area of the image are correlated in terms of their development to the subsequent frame(s), then it can be reasonable to assume that the detail is moving in a way that a human can track it in a meaningful way. On the other hand, if the optical flow of pixels is such that there is no flow for particular pixels, or that there is too much (e.g., too rapid) flow, then it can be reasonable to assign relatively fewer bits for the encoding of that content. As such, an optical flow criterion can be defined such that the flow criterion is met by frame features likely to be perceived, and is not met by frame features that are unlikely to be perceived.

In the present example, STA is also performed on the feature 306 in the area 300 of the video frame 302. In various implementations, the feature 306 may have the same shape as the feature 304 or a different shape. For example, the feature 306 here corresponds to a rotated version of the feature 304. Assume that the STA of the feature 306 indicates that the feature 306 meets the HPC. For example, an optical flow analysis performed on the feature 306 reveals that the pixels of the feature 306 have a flow that meets the HPC. For example, vectors (not shown) associated with the respective pixels of the feature 306 can satisfy a VCC. The feature 306 may therefore not be a candidate for having fewer bits assigned to it for the encoding process. For example, the feature 306 may then not be blurred before encoding, or an encoder can be instructed not to lower the amount of bits for the feature 306. That is, the feature 306, which may look identical or essentially identical to the feature 304 in the video frame 302, may be encoded using at least the normal or ordinary number of bits while the feature 304 may be encoded using fewer bits.

One or more areas of at least one frame can be assigned an increased number of bits for encoding. Assume that the feature 304 is deemed not to meet the HPC and that the feature 306 is deemed to meet the HPC. In some implementations, a system (e.g., the bit assignment module 120 in FIG. 1) can assign more bits for encoding the feature 306 than a normal or ordinary bit amount based on the STA. For example, the bit assignment can be made upon determining that the feature 306 not only meets the HPC but exceeds the HPC in some regard. If the feature 306 contains a relatively large amount of detail and/or remains relatively stationary over at least some number of video frames, the system can deem it worthwhile to assign an extra number of bits for the encoding of that feature. The assigned extra number of bits can be the same number as, or a larger or smaller number than, the number of bits by which the encoding of the feature 304 was reduced. An assignment of extra bits for encoding can be made for a feature in the same frame as a feature for which fewer bits is assigned, or to a feature in a different (e.g., subsequent or prior) frame than the frame at issue.

Figure 4:
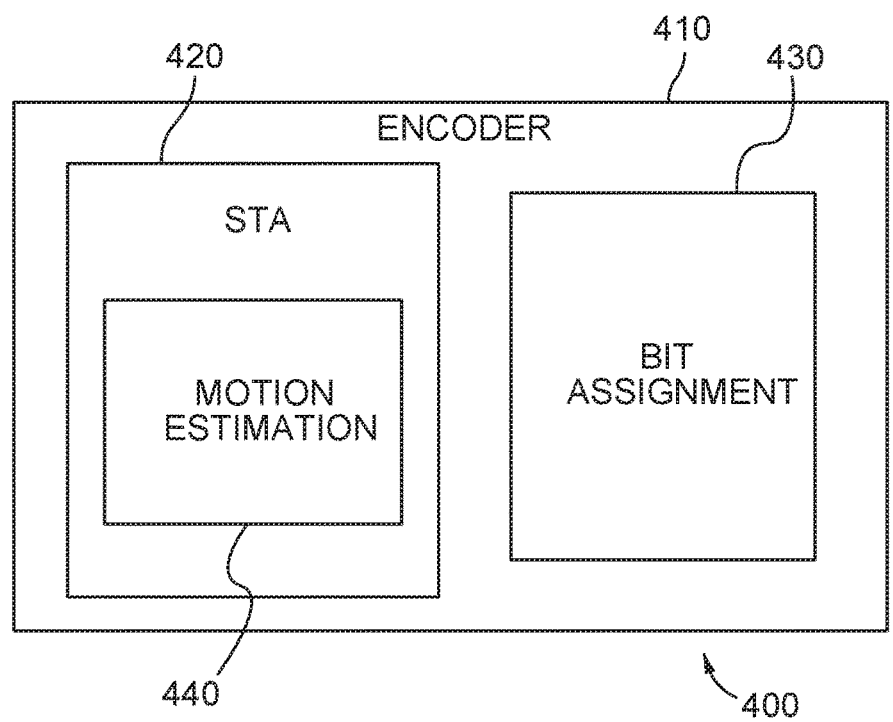
FIGS. 4-5 show examples of systems.
Figure 5:
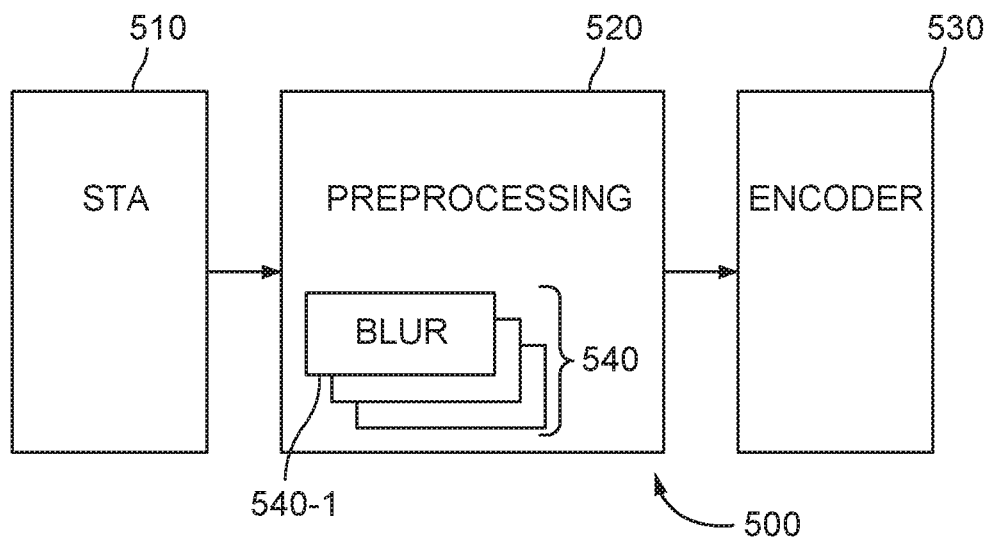

FIGS. 4-5 show examples of systems. The systems are shown as block diagrams. As such, system components can be implemented using software, hardware or combinations thereof. For example, a processor can execute instructions tangibly stored in a non-transitory storage medium. The organization in particular separate blocks is here done for illustrative purposes only. In some implementations, more blocks can be used and/or two or more blocks can be combined in the same component.

FIG. 4 shows an example of a system 400 that can be used for bit assignment based on STA. The system 400 includes an encoder 410. The encoder 410 is here configured to perform the STA and adjust the number of bits used for encoding accordingly. The encoder 410 includes an STA module 420 and a bit assignment module 430. The STA module 420 can perform STA, for example as described in any or all examples herein. In some implementations, the STA module 420 includes a motion estimation module 440 that can perform motion estimation and/or motion search of frames in a video sequence, such as in a way that is itself known in the art when used for compression. For example, as part of a coding process the encoder 410 determines a residual video content based on subtraction involving an original frame and a predicted frame. That residual content can then be encoded and, subsequently, used by a decoder to incrementally update a current frame to generate a next frame in the video sequence during playback. The encoder 410 can use the motion estimation module 440 to estimate motion between frames. That motion estimation can be akin to an optical flow, and can be used as part of an STA. As such, the motion estimation module 440 can be considered part of the STA module 420 in the encoder 410. The bit assignment module 430, moreover, can perform any or all operations described with regard to the bit assignment module 120 (FIG. 1). In some implementations, the bit assignment module 430 can instruct the encoder 410 and thereby cause it to apply fewer bits when encoding a feature in a video frame after that feature has been identified (e.g., by the STA module 420) as not meeting an HPC. For example, the bit assignment module 430 can provide a bit measure to the encoder 410 for the encoding.

FIG. 5 shows an example of a system 500 that can be used for bit assignment based on STA. The system 500 includes an STA module 510, a preprocessor such as preprocessing module 520 and an encoder 530. The STA module can perform any or all analysis described elsewhere herein, including, but not limited to, by the STA module 420 (FIG. 4). The encoder 530 can perform any or all analysis described elsewhere herein, including, but not limited to, by the encoder 130 (FIG. 1).

That is, the STA module 510 can identify one or more regions of a frame in a video sequence that does not meet an HPC. The output of the STA module 510 can be provided to the preprocessing module 520 or other preprocessor. The preprocessing module 520 can preprocess such region(s) before the encoder 530 encodes that region. In some implementations, the preprocessing module 520 can apply one or more preprocessing techniques 540 to a region that causes fewer bits to be used for encoding that region. For example, a processing technique that removes high-frequency components of an image representation, such as a blur function 540-1, can be used. The preprocessing module 520 can then create a modified feature in the video frame, wherein the encoder 530 encodes the modified feature using a smaller number of bits.

In some implementations, the preprocessing module 520 can perform iterative preprocessing (e.g., similar to the processing based on the feedback 160 in FIG. 1). For example, the preprocessing module 520 can monitor the bitrate output by the encoder 530 and determine whether it achieves a target bitrate. Until the target bitrate is achieved, the preprocessing module 520 can continue to apply one or more of the preprocessing techniques 540 to at least one region within the video frame sequence.

Figure 6:
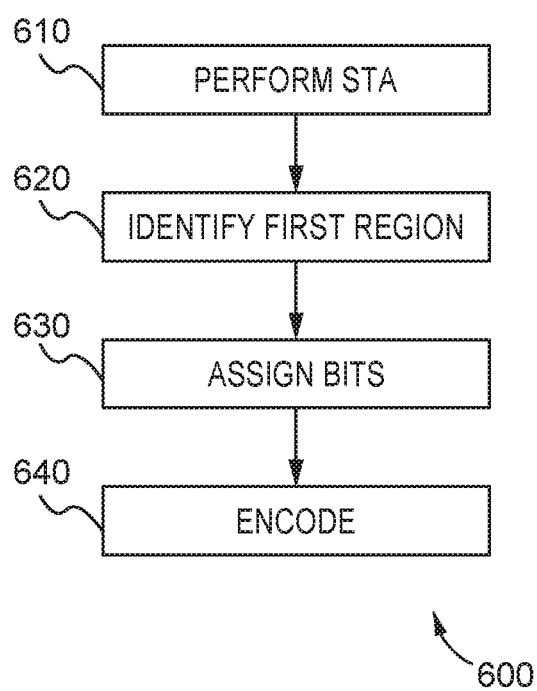
FIGS. 6-7 show examples of methods.
Figure 7:
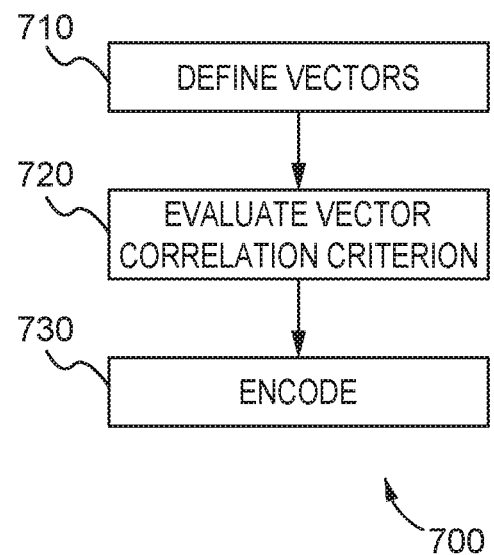

FIGS. 6-7 show examples of methods. A method can be performed by a processor executing instructions tangibly stored in a non-transitory storage medium. Two or more operations within the methods can be performed in a different order. More or fewer operations than shown can be performed.

FIG. 6 shows an example of a method 600 that can be used for assigning bits based on STA. At 610, STA can be performed on each frame of a video frame sequence, such as the video frame sequence 200 (FIG. 2). At 620, based on the STA, it can be determined how well a first region (e.g., the feature 304 in FIG. 3) of a first frame (e.g., the frame 302) of the video frame sequence meets an HPC. At 630, based on the identification, a bit weight can be assigned for an encoder to encode the first region. At 640, at least the first frame can be encoded based on the STA, wherein the first region is encoded using the assigned bit weight.

FIG. 7 shows an example of a method 700 that can be used for assigning a bit weight based on STA. At 710, vectors can be defined for a region of a frame in a video sequence, such as the vectors 308 in FIG. 3. At 720, a VCC can be evaluated. For example, the length and/or orientations of the defined vectors can be compared to the VCC. At 730, at least the frame can be encoded, using one or more bit weights depending on the evaluation of the VCC.

FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
performing spatio-temporal analysis on each frame of a video frame sequence, the spatio-temporal analysis including a determination of a speed of first video content based on at least first and second frames of the video sequence;
determining, based on the spatio-temporal analysis, whether the first video content meets a human-perception criterion of an ability to perceive;
assigning, based on the determination, a bit weight for an encoder to apply in encoding the first video content, wherein assigning the bit weight comprises preprocessing the first video content before the encoder encodes the first video content, the preprocessing modifying the first video content to create a modified first video content in the first frame, wherein the encoder encodes the modified first video content using the assigned bit weight, and wherein modifying the first video content comprises blurring the first video content without blurring at least second video content in the first frame; and
encoding, using the encoder, at least the first frame based on the spatio-temporal analysis, wherein the modified first video content is encoded using the assigned bit weight.

2. The method of claim 1, wherein the spatio-temporal analysis comprises an optical flow analysis of each frame of the video frame sequence.

3. The method of claim 2, wherein the determination regarding the first video content comprises determining that the first video content has no flow, or a flow larger than a flow criterion.

4. The method of claim 2, wherein the optical flow analysis comprises defining a vector for at least one pixel in the first video content based on at least the second frame of the video frame sequence, the vector representing a spatio-temporal change for the at least one pixel, wherein the human-perception criterion comprises a vector correlation criterion, and wherein the determination regarding the first video content comprises determining whether the vector meets the vector correlation criterion.

5. The method of claim 1, wherein the determination indicates that the first video content does not meet the human-perception criterion and second video content within the video frame sequence does meet the human-perception criterion, and wherein assigning the bit weight comprises assigning a lesser bit weight for the first video content than another bit weight assigned for the second video content, resulting in fewer bits being used for encoding the modified first video content than for encoding the second video content.

6. The method of claim 5, wherein the other bit weight is assigned to the second video content in response to determining that the first video content does not meet the human-perception criterion.

7. The method of claim 6, wherein the second video content is in the first frame.

8. The method of claim 1, further comprising iteratively changing an amount of preprocessing done in response to a bitrate output of the encoder until a target bitrate or a target quality score is achieved.

9. The method of claim 1, wherein the spatio-temporal analysis and the determination regarding the first video content comprise comparing first pixel contents of the first frame with second pixel contents of the second frame of the video frame sequence and determining how the first pixel contents develop spatially and temporally between the first and second frames.

10. The method of claim 1, wherein the determination includes determining how much the first video content corresponds to a predefined measure.

11. The method of claim 1, wherein the determination generates a Boolean value.

12. The method of claim 1, wherein the determination comprises a probabilistic determination.

13. The method of claim 12, wherein the probabilistic determination generates a result on a sliding scale of probability, and wherein assigning the bit weight comprises scaling the bit weight based on the result.

14. The method of claim 12, wherein the probabilistic determination generates a weight which indicates how likely the first video content meets the human-perception criterion.

15. A computer program product tangibly embodied in a non-transitory storage medium, the computer program product including instructions that when executed cause a processor to perform operations including:
performing spatio-temporal analysis on each frame of a video frame sequence, the spatio-temporal analysis including a determination of a speed of first video content based on at least first and second frames of the video sequence;
determining, based on the spatio-temporal analysis, whether the first video content meets a human-perception criterion of an ability to perceive;
assigning, based on the determination, a bit weight for an encoder to apply in encoding the first video content, wherein assigning the bit weight comprises preprocessing the first video content before the encoder encodes the first video content, the preprocessing modifying the first video content to create a modified first video content in the first frame, wherein the encoder encodes the modified first video content using the assigned bit weight, and wherein modifying the first video content comprises blurring the first video content without blurring at least second video content in the first frame; and
encoding, using the encoder, at least the first frame based on the spatio-temporal analysis, wherein the modified first video content is encoded using the assigned bit weight.

16. A system comprising:
a video frame sequence;
a processor;
a non-transitory storage medium including instructions that when executed by the processor generate a spatio-temporal analyzer for the video frame sequence, the spatio-temporal analyzer determining whether a first video content of a first frame of the video frame sequence meets a human-perception criterion of an ability to perceive, including a determination of a speed of the first video content based on at least the first frame and a second frame of the video sequence;
a preprocessor configured to preprocess the first video content before encoding, the preprocessor modifying the first video content to create a modified first video content in the first frame, wherein the preprocessor blurs the first video content without blurring at least second video content in the first frame; and an encoder that encodes, based on the spatio-temporal analyzer, at least the modified first video content in the first frame using a bit weight assigned based on the determination.

17. The system of claim 16, wherein the spatio-temporal analyzer is included in the encoder.

18. The system of claim 16, wherein the spatio-temporal analyzer is not included in the encoder.

19. The method of claim 1, wherein the human-perception criterion takes into account whether the first video content moves sufficiently fast between the first and second frames that a person is unlikely to perceive details of the first video content.

20. The method of claim 1, wherein blurring the first video content comprises removing components of the first video content above a frequency, such that fewer bits are used for encoding the first video content.

21. The computer program product of claim 15, wherein the human-perception criterion takes into account whether the first video content moves sufficiently fast between the first and second frames that a person is unlikely to perceive details of the first video content.

22. The system of claim of claim 16, wherein the preprocessor removes components of the first video content above a frequency, such that fewer bits are used for encoding the modified first video content.

23. The method of claim 1, wherein a standard bit weight has been predefined, and wherein the bit weight is defined either as equal to, as an upward departure from, or as a downward departure from, the standard bit weight.

24. The method of claim 1, wherein blurring the first video content comprises removing components of the first video content above a frequency, such that fewer bits are used for encoding the modified first video content.

25. The computer program product of claim 15, wherein a standard bit weight has been predefined, and wherein the bit weight is defined either as equal to, as an upward departure from, or as a downward departure from, the standard bit weight.

26. The computer program product of claim 15, wherein blurring the first video content comprises removing components of the first video content above a frequency, such that fewer bits are used for encoding the modified first video content.

27. The method of claim 23, wherein the determination indicates that the first video content does meet the human-perception criterion, and wherein assigning the bit weight comprises assigning at least the predefined standard bit weight.

28. The method of claim 27, wherein the determination indicates that the first video content significantly exceeds the human-perception criterion, and wherein assigning the bit weight comprises exceeding the predefined standard bit weight.

* * * * *

UNITED STATES PATENT AND TRADEMARK OFFICE
CERTIFICATE OF CORRECTION

PATENT NO. : 10,735,737 B1  
APPLICATION NO. : 15/454602  
DATED : August 4, 2020  
INVENTOR(S) : Peon It is certified that error appears in the above-identified patent and that said Letters Patent is hereby corrected as shown below:

In the Claims

In Column 17, Claim 22, Line 23, delete "of claim of claim" and insert -- of claim --, therefor.

Signed and Sealed this
Twenty-seventh Day of October, 2020

Andrei Iancu
*Director of the United States Patent and Trademark Office*